(12) United States Patent
Koyama

(10) Patent No.: US 7,420,748 B2
(45) Date of Patent: Sep. 2, 2008

(54) LENS APPARATUS AND OPTICAL APPARATUS

(75) Inventor: Atsushi Koyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 11/676,434

(22) Filed: Feb. 19, 2007

(65) Prior Publication Data
US 2007/0195430 A1    Aug. 23, 2007

(30) Foreign Application Priority Data
Feb. 20, 2006  (JP)  ............................. 2006-042651

(51) Int. Cl.
G02B 15/14    (2006.01)
(52) U.S. Cl. .................. 359/703; 359/700; 359/701
(58) Field of Classification Search ......... 359/694–703, 359/819–823
See application file for complete search history.

(56) References Cited

U.S. PATENT DOCUMENTS 3,897,998 A    8/1975  Canon 5,576,894 A *  11/1996  Kuwana et al. ............. 359/701
6,822,810 B2 * 11/2004  Ichino ........................ 359/696
2004/0095657 A1  5/2004  Takanashi
2005/0002011 A1  1/2005  Sudoh

FOREIGN PATENT DOCUMENTS

JP    2000-206389    7/2000
JP    2003-279822    10/2003

* cited by examiner

Primary Examiner—Mohammed Hasan
(74) Attorney, Agent, or Firm—Canon U.S.A., Inc., IP Division

(57) ABSTRACT

A lens apparatus includes a supporting member including a parallel engaging portion parallel to an optical axis direction and a circumferential engaging portion extending in the circumferential direction on a plane orthogonal to the optical axis direction; a lens supporting member configured to supported an optical element; an eccentricity adjusting mechanism including a first adjusting member supported on the parallel engaging portion of the supporting member on the outer periphery of the lens supporting member in a rotatable manner around an axis orthogonal to the optical axis; and an inclination adjusting mechanism including a second adjusting member supported on the circumferential engaging portion of the supporting member on the outer periphery of the lens supporting member in a rotatable manner around an axis orthogonal to the optical axis.

18 Claims, 5 Drawing Sheets

LENS APPARATUS AND OPTICAL APPARATUS

BACKGROUND OF THE INVENTION

1. Field of the Invention

The present invention relates to a lens apparatus having an adjusting structure for correcting displacement and inclination of the optical axis of an optical device and relates to an optical apparatus including the lens apparatus.

2. Description of the Related Art

In response to the recent need for an improvement in the quality of zoom lens systems included in optical apparatuses, such as interchangeable lens systems for single-lens reflex cameras, an improvement in the accuracy in maintaining lens units constituting the zoom lens systems has been required. Accordingly, an optical apparatus having an adjusting structure for adjusting the displacement and inclination of the optical axis of a lens unit caused by production errors has been proposed.

As a known optical apparatus, there is the lens apparatus disclosed in Japanese Patent Laid-Open No. 2003-279822. This lens apparatus has at least three adjusting screws, whose height can be adjusted in the optical axis direction, that are provided predetermined distances apart from each other. The lens apparatus includes a ring plate having notches for partially exposing the heads of the adjusting screws, a lens supporting frame attached to the inside of the lens barrel frame through the ring plate, and a spring member that urges the lens supporting frame toward the adjusting screws.

At least two eccentric screws that are disposed in contact with the peripheral area of the lens supporting frame with predetermined distances between each other and an elastic member for receiving the movement of the lens supporting frame caused by the rotation of the eccentric screws are provided on the inner periphery of the lens barrel frame. A structure configured to adjust the inclination of the lens by the adjusting screws and to adjust the axial center of the lens by the eccentric screws is disclosed.

Another known lens apparatus is disclosed in Japanese Patent Laid-Open No. 2000-206389. This lens apparatus includes a first frame that holds a lens or a lens barrel, a second frame that supports the first frame by an elastic section, and a third frame that supports the second frame by another elastic section. The lens apparatus further includes two adjusting members that are provided on the second frame while being in contact with the first frame and that adjust the inclination of the optical axis and the parallel movement of the optical axis. The lens apparatus further includes two adjusting members that are provided on the third frame while being in contact with the second frame and that adjust the inclination of the optical axis and the parallel movement of the optical axis, respectively.

A structure configured to adjust the inclination and eccentricity by operating the adjusting members and by using the deformation of the elastic sections is disclosed.

According to the apparatus disclosed in Japanese Patent Laid-Open No. 2003-279822, adjusting screws and eccentric screws are operated from the optical axis direction. Therefore, when an adjusting operation is to be carried out while the apparatus is being actually used, jigs and the operator's hands used for tightening the adjusting screws and eccentric screws are easily captured in the image, and this may interfere with the adjusting operation. Based on the structure of the apparatus, it is possible to adjust the outermost lens units among the lens units constituting the zoom lens system. However, since it is difficult to adjust the lens units disposed near the center among the lens units constituting the zoom lens system, flexibility in the optical design is reduced.

The apparatus disclosed in Japanese Patent Laid-Open No. 2000-206389 allows adjusting members that adjust the inclination of the optical axis and the parallel movement of optical axis can be operated in a direction orthogonal to the optical axis. However, the adjusting members that adjust lenses at predetermined positions form an overlapping structure, causing an increase in the size of the lens barrel.

SUMMARY OF THE INVENTION

The present invention provides a lens apparatus and an optical apparatus including the lens apparatus that enable inclination and eccentricity adjustment of a lens system to be effectively carried out in an accurate manner and that allow the size of the apparatus to be reduced.

A lens apparatus according to a first aspect of the present invention includes a supporting member including a parallel engaging portion parallel to an optical axis direction and a circumferential engaging portion extending in the circumferential direction on a plane orthogonal to the optical axis direction; a lens supporting member configured to supported an optical element; an eccentricity adjusting mechanism including a first adjusting member supported on the parallel engaging portion of the supporting member on the outer periphery of the lens supporting member in a rotatable manner around an axis orthogonal to the optical axis; and an inclination adjusting mechanism including a second adjusting member supported on the circumferential engaging portion of the supporting member on the outer periphery of the lens supporting member in a rotatable manner around an axis orthogonal to the optical axis.

Further features of the present invention will become apparent from the following description of exemplary embodiments (with reference to the attached drawings).

DESCRIPTION OF THE EMBODIMENTS

Embodiments of the present invention will be described below with reference to the drawings.

First Embodiment

Figure 1:
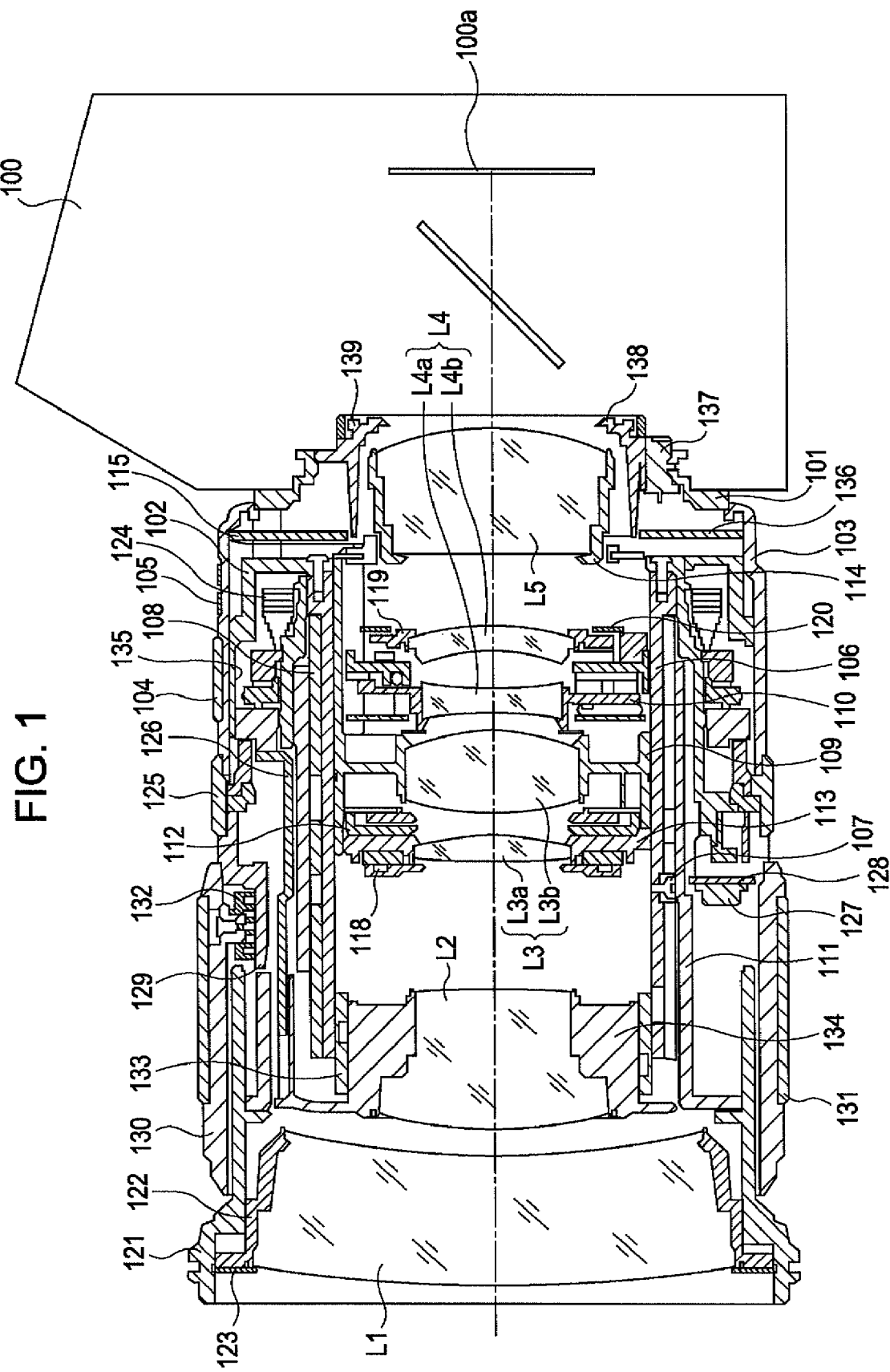
FIG. 1 is a cross-sectional view of a lens barrel and a camera according to a first embodiment of the present invention.

FIG. 1 illustrates an interchangeable lens system that is a lens apparatus according to this embodiment of the present invention and a camera including the interchangeable lens system as an optical apparatus. In the embodiments of the present invention, an optical apparatus comprises a camera including the interchangeable lens system or a camera with an integrated lens system.

As shown in FIG. 1, an interchangeable lens system 1 is a zoom lens system comprising five lens units, i.e., first to fifth lens units L1 to L5. The third lens unit L3 includes subunits L3a and L3b. The fourth lens unit L4 includes subunits L4a and L4b. In the above-described interchangeable lens system 1, all lens units L1 to L5 move in the optical axis direction during zooming, whereas, the second lens unit L2 moves in the optical axis direction during focusing. At this time, the third lens unit L3 and the fifth lens unit L5 move together, and the subunit L4a that is provided on the object side in the fourth lens unit L4 moves, in addition to the optical axis direction, in a direction orthogonal to the optical axis direction for vibration correction.

A camera main body 100 includes an image pickup element 100a, such as a CCD or a CMOS sensor.

A lens mount 101 includes a bayonet section for attaching the camera main body 100, and is fixed lens with screws to a fixed barrel 102.

An external ring 103 is interposed and fixed between the mount 101 and the fixed barrel 102. On the external ring 103, a scale window 104, a name plate 105, and an SW panel (not shown) are attached. By operating a switch provided on the SW panel, functions such as autofocus and vibration correction can be selected and used.

A guiding barrel 106 is screwed onto the fixed barrel 102 so as to constitute a fixed section fixed to the camera main body. A cam barrel 108 that is rotatable around the optical axis by a roller 107 is engaged with the outer periphery of the guiding barrel 106. Accordingly, as the cam barrel 108 is rotated, the intersecting point of a guiding groove provided on the guiding barrel 106 in the optical axis direction and a cam groove provided on the cam barrel 108 moves. As the intersecting point moves, a subunit-L3b supporting frame 109 that holds the subunit L3b provided on the image-plane side of the third lens unit L3 can be moved in the optical axis direction by a roller (not shown) fixed with a screw.

Similarly, a vibration correction unit 110 that supports the fourth lens unit L4 and a linear barrel 111 can each be moved in the optical axis direction by rollers (not shown) fixed thereto with screws.

An electromagnetic aperture unit 112 that includes an aperture driving unit and an aperture blade unit is disposed on the subunit-L3b supporting frame 109 in a manner such that the electromagnetic aperture unit 112 is interposed between the subunit-L3b supporting frame 109 and a subunit-L3a supporting frame 113 that holds the subunit L3a provided on the object side of the third lens unit L3. At the rear edge of an extending portion 109a of the subunit-L3b supporting frame 109 (shown in FIG. 2), a fifth-lens-unit supporting frame 114 that supports the fifth lens unit L5 is supported by a fifth-lens-unit supporting plate 115 screwed onto the subunit-L3b supporting frame 109, first adjusting members 116, and second adjusting members 117, which are described below.

A sub-aperture 118 that determines the diameter of the aperture and that blocks harmful rays is elastically joined to the front of the front edge of the subunit-L3a supporting frame 113.

The vibration correction unit 110 supports the subunit L4a in a manner such that the subunit L4a is movable in a direction orthogonal to the optical axis. The vibration correction unit 110 drives the subunit L4a with a driving unit including a magnet and a coil. At the rear edge, a subunit-L4b supporting frame 119 that supports the subunit L4b provided on the image-plane side of the fourth lens unit L4 is fixed with screws through a reinforcement plate 120. A filter frame 121 is screwed onto the linear barrel 111.

On the outer periphery of the tip of the filter frame 121, a bayonet section is provided, and on the inner periphery of the tip of the filter frame 121, a screw section is provided. Various accessories, such as a hood and a filter, can be attached to these sections.

A first-lens-unit supporting frame 122 that supports the first lens unit L1 is screwed onto the filter frame 121. The contact areas of the filter frame 121 and the first-lens-unit supporting frame 122 are provided as inclined surfaces extending in the circumferential direction. Thus, as the first-lens-unit supporting frame 122 is rotated and attached to the filter frame 121, the attachment position of the first-lens-unit supporting frame 122 on the filter frame 121 in the optical axis direction can be selected. In this way, displacement of the focal positions on the wide-angle side and the telephoto side due to production errors can be corrected.

The name of the lens and so on are printed on the front surface of a decorated ring 123. A focusing unit 124 is screwed onto the guiding barrel 106. The focusing unit 124 is mainly constituted by a vibrating motor and a differential mechanism. The focusing unit 124 outputs a rotation amount of a focusing key 126 corresponding to the rotation amount of the rotor of the vibrating motor and the rotation amount of a manual ring 125.

A gyro substrate 128, to which a pair of vibrating gyros 127 for detecting the angular rate of vibration in the horizontal and vertical directions are soldered, is screwed on the front side of the focusing unit 124.

An encoder flexible substrate 129 on which a gray code pattern is formed is attached to the outer periphery of a protrusion extending in a circular manner from the focusing unit 124.

A protrusion is provided on the front side of the focusing unit 124 where the vibrating gyros 127 and the encoder flexible substrate 129 are not provided. A roller (not shown) is screwed onto the protrusion.

A zooming ring 130 can be rotated only around the optical axis, while movement in the optical axis direction is blocked, by a roller (not shown) engaged with a groove provided in the circumferential direction of the zooming ring 130.

A depression that is engaged with a zoom key (not shown) screwed onto the cam barrel 108 is formed on the inner periphery of the zooming ring 130. In this way, the cam barrel 108 can be rotated together with the zooming ring 130 by the zoom key.

In the interchangeable lens system according to this embodiment, the vibrating gyros 127 are disposed at positions away from the camera main body (i.e., in front of the focusing unit 124). In this way, the vibration generated by the camera main body (i.e., vibration caused by the shutter screen movement and the up and down movement of a mirror) is not easily transmitted to the vibrating gyros 127. Thus, known methods for storing the interchangeable lens system into a case do not have to be employed.

By providing an alignment portion in the optical axis direction of the zooming ring 130 where the vibrating gyros 127 are not provided, the vibrating gyros 127 can be disposed without increasing the outer diameter of the lens. By employing such a method, the size of the interchangeable lens system is reduced.

A zooming rubber 131 is wrapped around the outer periphery of the zooming ring 130.

A zooming brush 132 that is screwed onto the zooming ring 130 is used to detect the positional relationship between the zooming ring 130 and the encoder flexible substrate 129 by sliding over the gray code pattern of the encoder flexible substrate 129.

A roller (not shown) is screwed onto an inner cam barrel 133. The roller engages with a cam groove formed in the guiding barrel 106 and a groove formed in the cam barrel 108 in the optical axis direction. Therefore, the inner cam barrel 133 rotates together with the cam barrel 108 and moves forward or backward in the optical axis direction.

In a send-lens-unit supporting frame 134 that supports the second lens unit L2, a protrusion provided on the outer periphery is engaged with a cam groove formed in the inner periphery of the send-lens-unit supporting frame 134. A key section extending from the send-lens-unit supporting frame 134 is engaged with and rotates together with the focusing key 126. Therefore, when the cam barrel 108 is rotated (while the focusing key 126 is stopped), the send-lens-unit supporting frame 134 moves forward or backward in the optical axis direction by an amount determined by adding the movement amount of the inner cam barrel 133 in the forward or backward direction in the optical direction and the amount of change in the optical axis direction of the engagement point as the cam groove of the inner cam barrel 133 rotates.

When the focusing key 126 is rotated (while the cam barrel 108 is stopped), the focusing key 126 moves forward or backward while rotating depending on the amount of change in the optical axis direction of the engagement point of the cam groove of the inner cam barrel 133.

By using the above-described mechanism, the interchangeable lens system according to this embodiment mechanically corrects the displacement of the focal position caused by a change in the focal length of the inner focus, and moves the second lens unit L2 forward or backward in the optical axis direction.

A scale sheet 135 rotates together with the focusing key 126 that is the output of the focusing unit 124 and displays the focal position together with the scale window 104.

A main substrate 136 is directly or electrically connected to the focusing unit 124, the electromagnetic aperture unit 112, the vibration correction unit 110, the gyro substrate 128, and the encoder flexible substrate 129 via a flexible substrate.

A contact block 137 is screwed onto the mount 101, and is connected to the main substrate 136 via the flexible substrate, and is provided to carry out communication with the camera main body and to supply power. A back cover 138 is elastically connected to the mount 101 and blocks harmful rays. A protective rubber ring 139 is elastically connected to the back cover 138.

With the interchangeable lens system having the above-described structure, when the zooming ring 130 is rotated, the cam barrel 108 rotates via the zooming key, and, according to the above-described mechanism, all lens units L1 to L5 move forward or backward in the optical axis direction for zooming. At this time, the third lens unit L3 and the fifth lens unit L5 move forward or backward together. As the third lens unit L3 moves forward or backward, the sub-aperture 118 opens or closes so as to determine the diameter of the aperture.

The focusing key 126 is rotated by driving the vibrating motor for autofocus or by rotating the manual ring 125 for manual focusing. In this way, according to the above-described mechanism, the second lens unit L2 moves forward or backward so as to carry out focusing.

During vibration correction, the subunit L4a of the vibration correction unit 110 is driven on a surface orthogonal to the optical axis in a direction that cancels out the movement of the image on the film surface caused by the generated vibration in accordance with the output of the vibrating gyros 127 and the output of the encoder flexible substrate 129.

Figure 2:
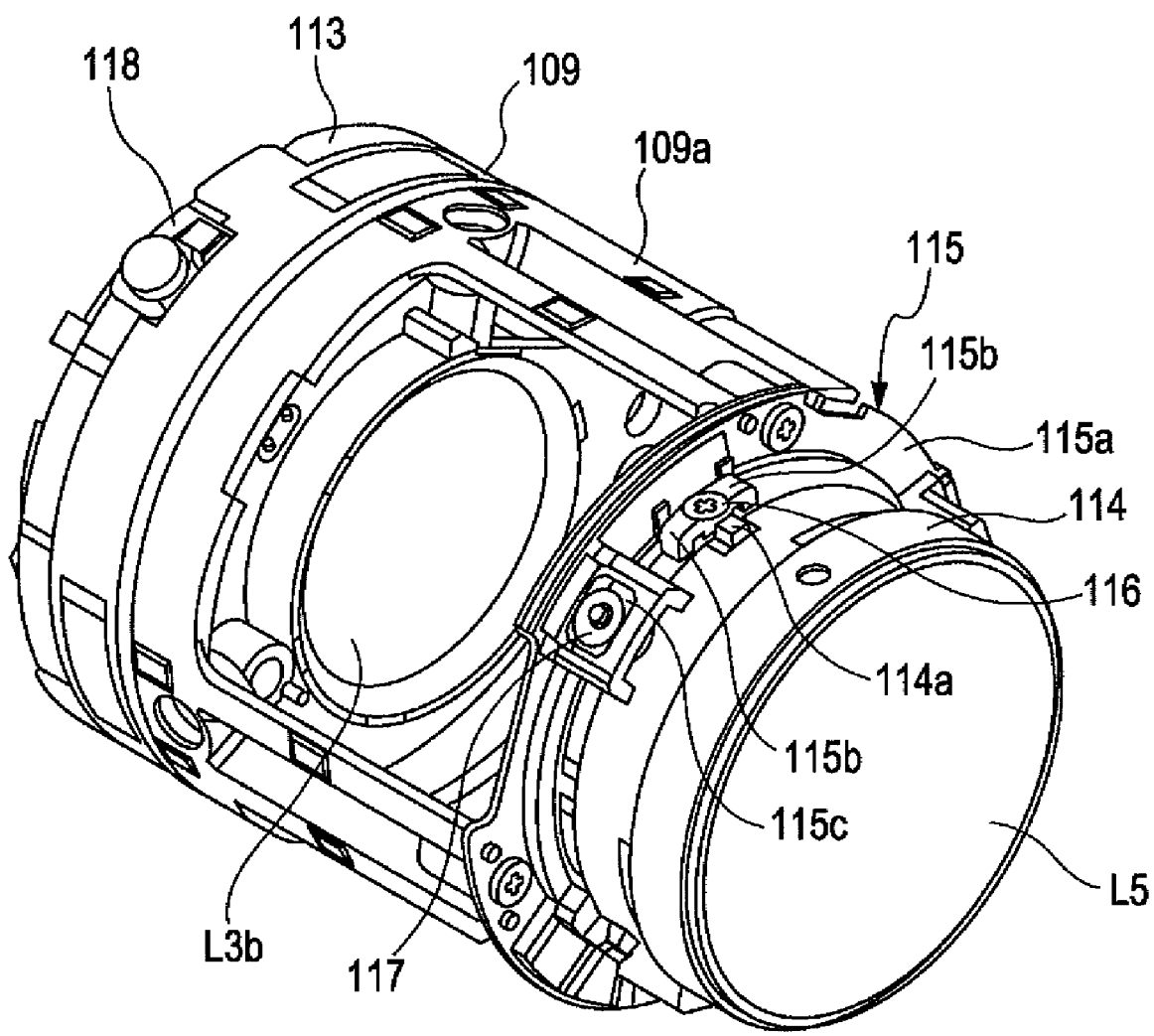
FIG. 2 is a perspective view of a lens adjusting mechanism of the lens barrel according to the first embodiment of the present invention.
Figure 3:
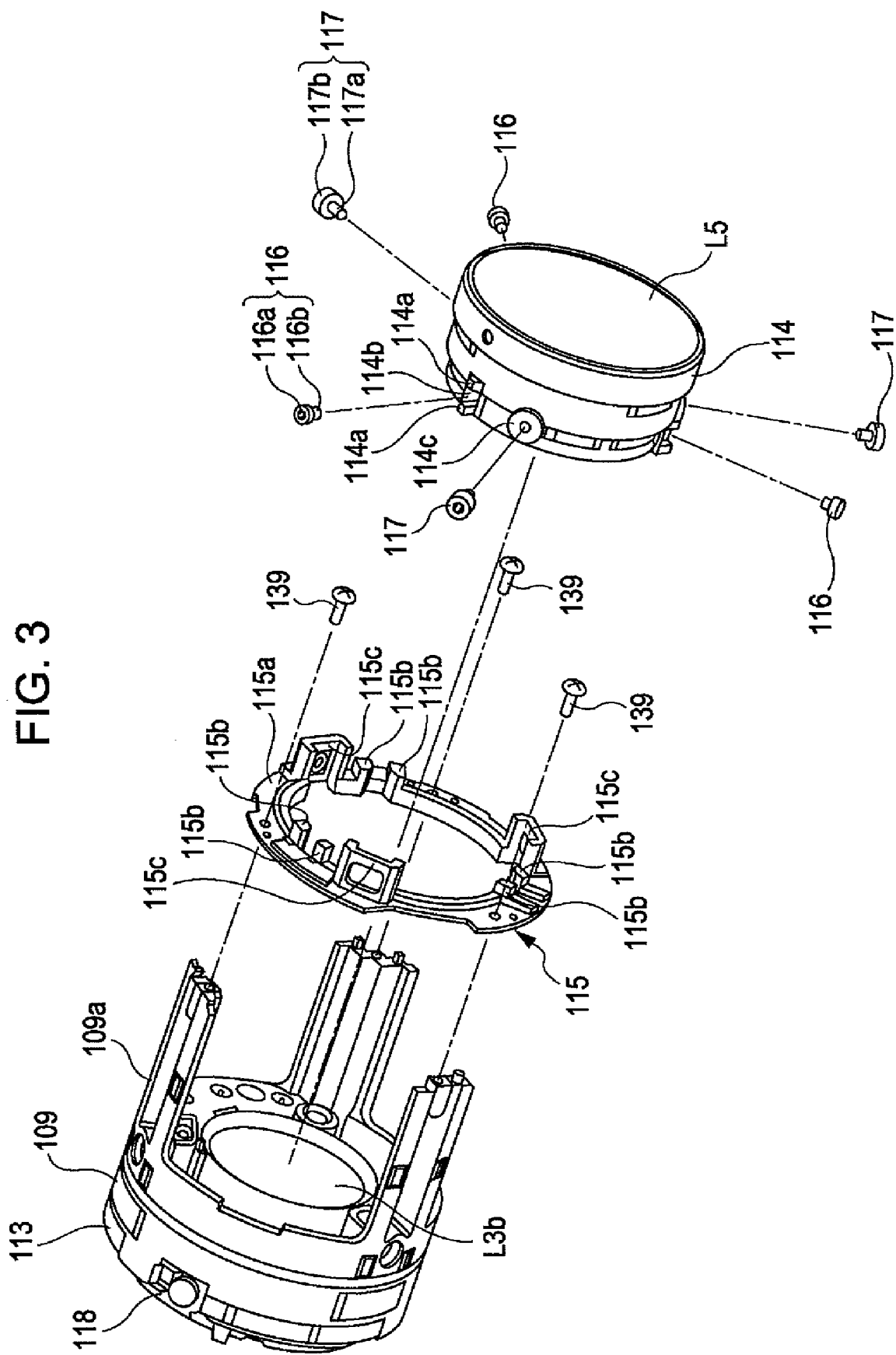
FIG. 3 is an exploded perspective view of a lens adjusting mechanism of the lens barrel according to the first embodiment of the present invention.

Next, the lens supporting structure that supports and connects the subunit L3b and the fifth lens unit L5 will be described with reference to FIGS. 2 and 3. FIG. 2 is a perspective view of the assembled main components of an adjusting mechanism according to the first embodiment of the present invention. FIG. 3 is a perspective view of the dissembled main components of an adjusting mechanism according to the first embodiment of the present invention.

As described above, at the rear edge of the extending portion 109a of the subunit-L3b supporting frame 109, the fifth-lens-unit supporting plate 115 is fixed with screws 139. On the fifth-lens-unit supporting plate 115, the fifth-lens-unit supporting frame 114 supporting the fifth lens unit L5 is held by the first adjusting members 116 and the second adjusting members 117.

In the fifth-lens-unit supporting plate 115, a metal base plate 115a is inserted, and parallel engaging portions 115b and 115b that form long grooves parallel to the optical axis, and circumferential engaging portions 115c that are long grooves extending in the peripheral direction in a plane orthogonal to the optical axis, are formed on resin material, such as polyacetal (POM), having relatively great elasticity. The parallel engaging portions 115b and 115b and the circumferential engaging portions 115c are provided at three positions, preferably at equal angles apart from each other around the optical axis. The parallel engaging portions 115b and 115b and the circumferential engaging portions 115c at each of the three positions are disposed adjacent to each other.

The first adjusting members 116 are disposed on the outer periphery of the fifth-lens-unit supporting frame 114 at three positions, preferably at equal angles apart from each other around the optical axis.

Each of the first adjusting members 116 includes a cylindrical head portion 116a centered on an axis that extends in the radial direction from the optical axis and orthogonal to the optical axis and an eccentric axial portion 116b that is centered on an axis that is decentered from the central axis of the head portion 116a.

The head portion 116a of the first adjusting member 116 is press-fit into the space between the parallel engaging portions 115b and 115b (i.e., the long groove parallel to the optical axis) in a rotatable manner. The head portion 116a of the first adjusting member 116 is press-fit into the section between protrusions 114a and 114a provided on the outer periphery of the fifth-lens-unit supporting frame 114 in a rotatable manner. The eccentric axial portion 116b of the first adjusting members 116 is press-fit into a groove section 114b that extends in the optical axis direction and that is provided on the outer periphery of the fifth-lens-unit supporting frame 114 in a rotatable manner.

The above-described eccentric axial portion 116b is provided on at least two of the three first adjusting members 116, and the remaining first adjusting members 116 may include an axial portion that is not eccentric.

According to the above-described structure, the position of the fifth-lens-unit supporting frame 114 is restricted on the plane orthogonal to the optical axis by the first adjusting members 116. The first adjusting members 116 can be rotated around the radial direction centered on the optical axis.

The second adjusting members 117 are provided on the outer periphery of the fifth-lens-unit supporting frame 114 at three positions, preferably at equal angles apart from each other around the optical axis and adjacent to the first adjusting members 116.

Each of the second adjusting members 117 is rotatably supported on the plug 114 by press-fitting a rotational axis section 117a that is centered on an axis extending in the radial direction from the optical axis into a hole 114c formed on the outer periphery of the fifth-lens-unit supporting frame 114.

The second adjusting member 117 includes an axial section 117a and an eccentric head portion 117b having an eccentric axis. The eccentric head portion 117b is engaged with engaging portions (long grooves) 115c provided on the fifth-lens-unit supporting plate 115.

The above-described eccentric head portion 117b is provided on at least two of the three second adjusting members 117, and the remaining second adjusting member 117 may include an axial portion that is not eccentric.

According to the above-described structure, the position of the fifth-lens-unit supporting frame 114 is restricted on the plane orthogonal to the optical axis by the second adjusting members 117. The second adjusting members 117 can be rotated around the radial direction centered on the optical axis.

Next, the adjusting operation of the first adjusting members 116 and the second adjusting members 117 will be described. As described above, the first adjusting members 116 and the second adjusting members 117 are rotatably supported around an axis extending in the radial direction from the optical axis.

First, the eccentric adjustment of the fifth-lens-unit supporting frame 114 (fifth lens unit L5) will be described. The head portions 116a of the first adjusting members 116 are rotated. In this way, while the position of the fifth-lens-unit supporting frame 114 is restricted in the optical axis direction by the second adjusting members 117 and the circumferential engaging portions (long grooves) 115c, the fifth-lens-unit supporting frame 114 moves on a plane orthogonal to the optical axis by the mutual operation of the eccentric axial portions 116b and the groove sections 114b. In other words, by each of the head portions 116a rotating between the parallel engaging portions 115b and 115b, the eccentric axial portion 116b eccentrically rotates and pushes the groove sections 114b parallel to the optical axis (i.e., the groove sections 114b move in the circumferential direction). Therefore, the fifth-lens-unit supporting frame 114 rotates (moves) in the circumferential direction. At this time, the protrusions 114a and 114a also move in the circumferential direction together with the groove sections 114b.

By rotating at least two of the first adjusting members 116, the fifth-lens-unit supporting frame 114 can be moved to any position on the plane orthogonal to the optical axis. Since such an eccentricity adjustment is carried out by rotating the first adjusting members 116, force is generated in the optical axis direction with respect to the fifth-lens-unit supporting frame 114. Since the first adjusting members 116 and the second adjusting members 117 are disposed adjacent to each other, the force in the optical axis direction can minimize the change in inclination of the fifth-lens-unit supporting frame 114 by the restriction of the second adjusting members 117 and the circumferential engaging portions 115c in the optical axis direction.

Next, inclination adjustment of the fifth-lens-unit supporting frame 114 (fifth lens unit L5) will be described. The eccentric head portions 117b of the second adjusting members 117 are rotated. In this way, the inclination angle of the fifth-lens-unit supporting frame 114 gradually changes in accordance with the amount of eccentricity of the rotational axis sections 117a and the eccentric head portions 117b. The position of the fifth-lens-unit supporting frame 114 is restricted in a direction orthogonal to the optical axis by the first adjusting members 116 and the parallel engaging portions 115b and 115b. By operating at least two second adjusting members 117, the fifth-lens-unit supporting frame 114 (fifth lens unit L5) is adjusted to any inclination angle and any inclination direction. Since such an inclination adjustment is carried out by rotating the second adjusting members 117, force is generated in the circumferential direction with respect to the fifth-lens-unit supporting frame 114. Since the first adjusting members 116 and the second adjusting members 117 are disposed adjacent to each other, the change in the position of the fifth-lens-unit supporting frame 114 in the circumferential direction can be minimized.

Finally, adjustment carried out by the entire system of the first to fifth lens units L1 to L5 will be described. Before assembling the mount 101, the fixed barrel 102, the external ring 103, the focusing unit 124, the manual ring 125, the main substrate 136, and the components fixed thereto among the components illustrated in FIG. 1, the guiding barrel 106 is fixed to an adjusting jig (not shown). In this state, the position (eccentricity adjustment) in a direction orthogonal to the optical axis and the inclination of the fifth-lens-unit supporting frame 114 supporting the fifth lens unit L5 are adjusted with respect to the fifth-lens-unit supporting plate 115 screwed onto the rear edge of the extending portion 109a of the sub-unit-L3b supporting frame 109 supporting the subunit L3b.

In this way, degradation in the optical performance caused by production errors of the first to fifth lens units L1 to L5 and the components supporting thereof is corrected, and desired optical performance can be achieved. In such a case, more than three adjusting members may be employed for both eccentricity and inclination adjustment, and they need not be located at equal angles from one another.

Second Embodiment

Figure 4:
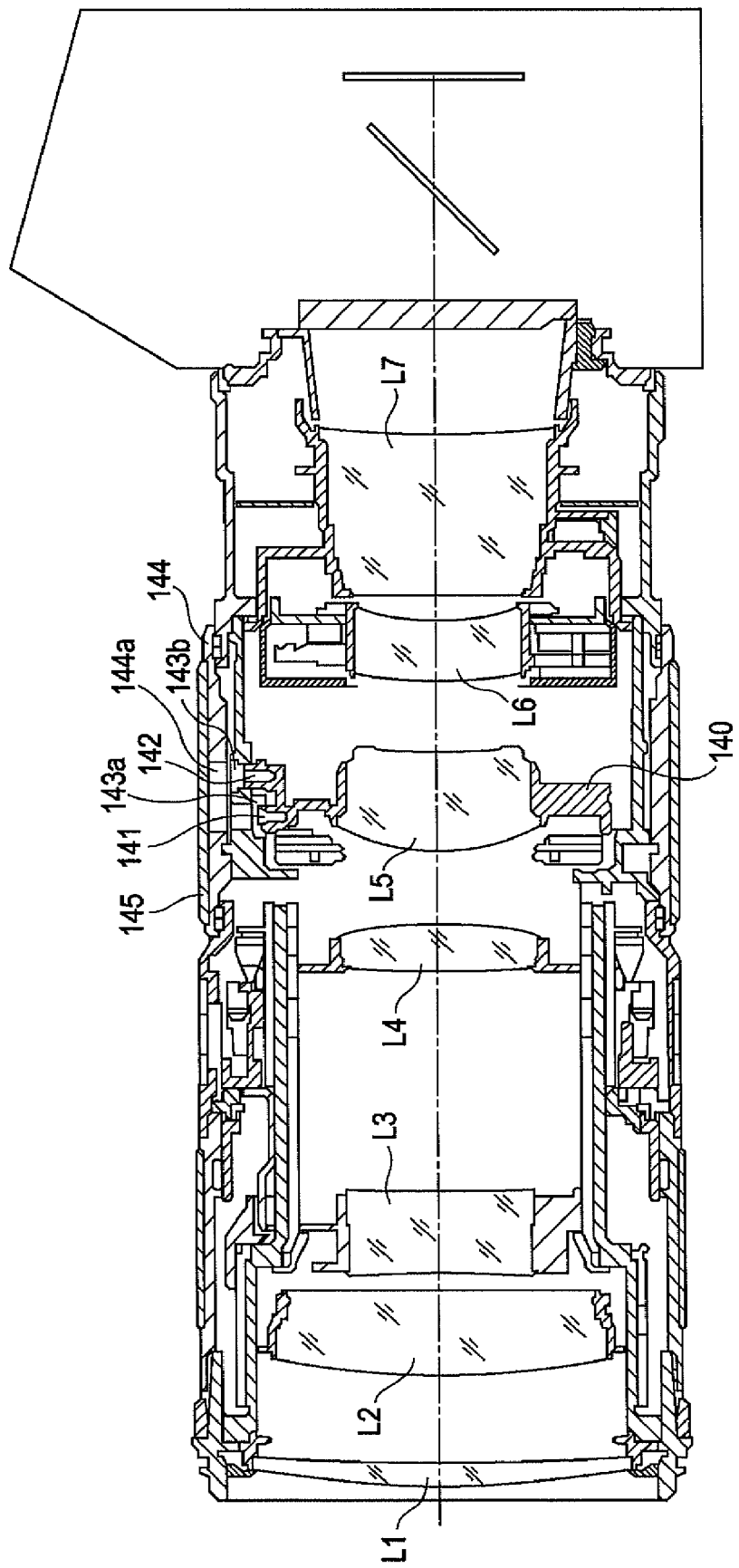
FIG. 4 is a cross-sectional view of a lens barrel and a camera according to a second embodiment of the present invention.
Figure 5:
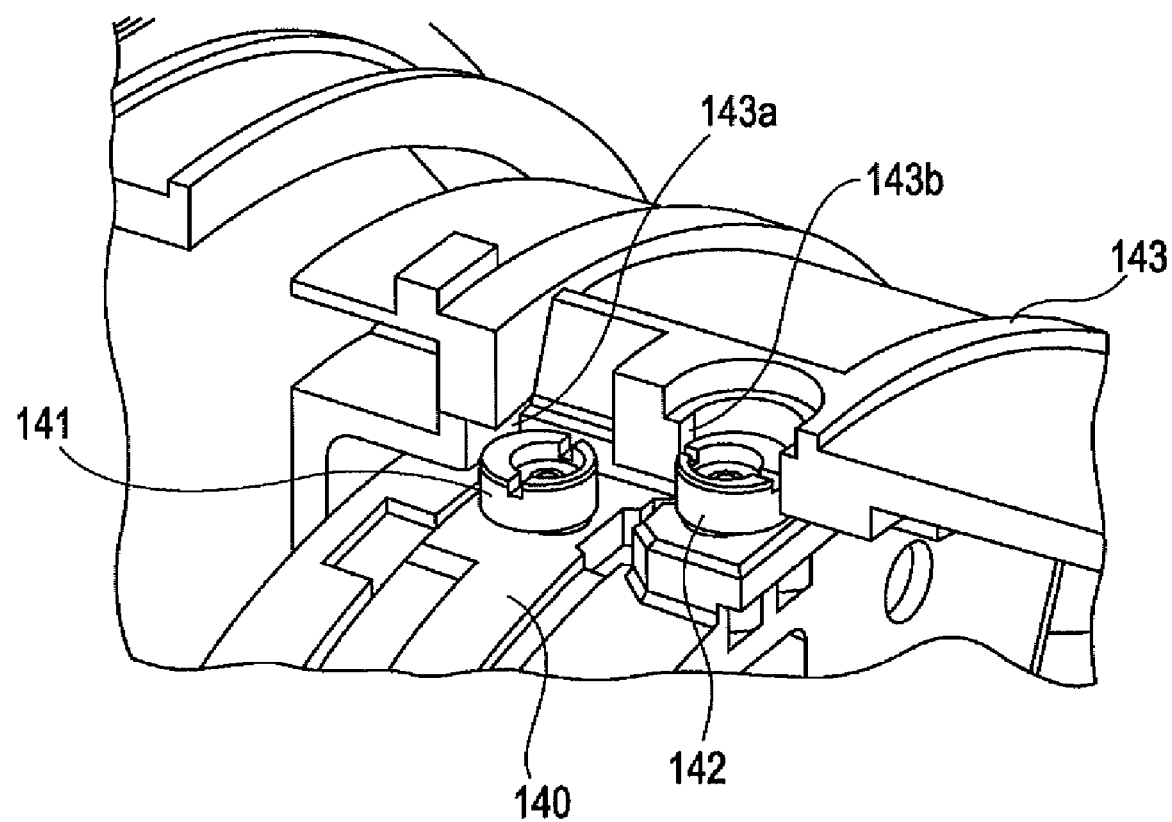
FIG. 5 is a cross-sectional perspective view of the main parts of the lens barrel according to the second embodiment.

FIG. 4 illustrates a camera including an interchangeable lens system that is a lens apparatus according to a second embodiment of the present invention and an interchangeable lens system that is an optical apparatus. FIG. 5 is an enlarged cross-sectional perspective view of the main components shown in FIG. 4. The second embodiment will be described with reference to FIGS. 4 and 5.

The interchangeable lens system includes seven lens units, i.e., first to seventh lens units L1 to L7. For zooming, the third lens unit L3 and the fourth lens unit L4 move in the optical axis direction, whereas, for focusing, the second lens unit L2 moves in the optical axis direction. The sixth lens unit L6 moves in a direction orthogonal to the optical axis so as to carry out vibration correction.

Next, the components included in the adjusting mechanism according to this embodiment of the present invention will be described. On the outer periphery of a fifth-lens-unit supporting frame 140 that supports the fifth lens unit L5, eccentric rollers 141 that are first adjusting members for eccentricity adjustment are provided. Eccentric rollers 142 that are second adjusting members for inclination adjustment are also provided. The eccentric rollers 141 and the eccentric rollers 142 are provided at three positions, preferably at equal angles apart from each other around the optical axis and are fixed by screws in a rotatable manner around an axis extending in the radial direction of the optical axis. The eccentric rollers 141 and the eccentric rollers 142 can be rotated around the radial direction with respect to the optical axis and are disposed adjacent to each other in the optical direction.

A fixed barrel 143 is an intermediate barrel disposed on the outer periphery of the fifth-lens-unit supporting frame 140. On the fixed barrel 143, parallel engaging portions 143a and 143a that form long grooves parallel to the optical axis and circumferential engaging portions 143b that are long grooves extending in the peripheral direction in a plane orthogonal to the optical axis are provided at three positions equal angles apart from each other around the optical axis and adjacent to each other in the optical axis direction. According to the first embodiment, the parallel engaging portions and the circumferential engaging portions are provided adjacent to each other in the circumferential direction of the fifth-lens-unit supporting frame. However, according to the second embodiment, the parallel engaging portions and the circumferential engaging portions are provided adjacent to each other in the optical axis direction.

Each of the eccentric rollers 141 and the eccentric rollers 142 includes a cylindrical portion (eccentric head portion) having an axis decentered from the rotational axis. The eccentric cylindrical portion of the eccentric roller 141 is press-fit into the section between the engaging portions (longitudinal grooves) 143a and 143a in a rotatable manner. The eccentric cylindrical portion of the eccentric roller 142 is press-fit into the circumferential engaging portion (long groove) 143b in a rotatable manner.

According to the above-described structure, eccentricity adjustment is carried out by the eccentric rollers 141 and the engaging portions (longitudinal grooves) 143a and 143a, and inclination adjustment is carried out by the eccentric rollers 142 and the engaging portions (long grooves) 143b. In this way the same functions and advantages as those according to the first embodiment are achieved.

On the outer periphery of the fixed barrel 143, a zooming ring 144 is supported in a rotatable manner by a bayonet while the movement of the zooming ring 144 in the optical axis direction is restricted.

A zooming rubber 145 is wrapped around the outer periphery of the zooming ring 144. Holes 144a are formed in the zooming ring 144 so that the eccentric rollers 141 and 142 are exposed when the zooming rubber 145 is removed. Through the holes 144a, the eccentric rollers 141 and 142 can be rotated around the radial direction with respect to the optical axis.

In this way, degradation in the optical performance caused by production errors of the first to seventh lens units L1 to L7 and the components supporting thereof can be corrected without dissembling the lens barrel and by removing only the zooming rubber 145. Accordingly, desired optical performance can be achieved. In such a case, more than three adjusting members may be employed for both eccentricity and inclination adjustment, and they need not be located at equal angles from one another.

According to the embodiments of the present invention, the adjustment of inclination and eccentricity of a lens system can be carried out effectively in an accurate manner. Moreover, the size of the apparatus can be reduced. In particular, more than three adjusting members may be employed for both eccentricity and inclination adjustment, and they need not be located at equal angles from one another.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-042651 filed Feb. 20, 2006, which is hereby incorporated by reference herein in its entirety.

What is claimed is:

1. A lens apparatus comprising:
a supporting member including,
a parallel engaging portion parallel to an optical axis direction, and
a circumferential engaging portion extending in the circumferential direction on a plane orthogonal to the optical axis direction;
a lens supporting member configured to supported an optical element;
an eccentricity adjusting mechanism including a first adjusting member supported on the parallel engaging portion of the supporting member on the outer periphery of the lens supporting member in a rotatable manner around an axis orthogonal to the optical axis; and
an inclination adjusting mechanism including a second adjusting member supported on the circumferential engaging portion of the supporting member on the outer periphery of the lens supporting member in a rotatable manner around an axis orthogonal to the optical axis.

2. The lens apparatus according to claim 1, wherein,
three first adjusting members and three second adjusting members are disposed at three positions around the optical axis at substantially equal angles apart from each other, and
at least two of the first adjusting members and at least two of the second adjusting members are eccentric members including a cylindrical portion decentered with respect to the rotational axis.

3. The lens apparatus according to claim 1, wherein the first adjusting member and the second adjusting member are disposed adjacent to one another.

4. The lens apparatus according to claim 1, wherein,
the movement of the eccentricity adjusting mechanism in the optical axis direction is restricted by the inclination adjusting mechanism during an eccentricity adjustment operation, and
the movement of the inclination adjusting mechanism on a plane orthogonal to the optical axis is restricted by the eccentricity adjusting mechanism during an inclination adjustment operation.

5. The lens apparatus according to claim 1, wherein the first adjusting member and the second adjusting member are operatable from the outer periphery of the lens barrel.

6. The lens apparatus according to claim 1, wherein the supporting member supports an optical element.

7. A camera comprising:
a lens apparatus according to claim 1; and
an image pickup element configured to receive light from the lens apparatus.

8. A camera comprising:
a lens apparatus according to claim 2; and
an image pickup element configured to receive light from the lens apparatus.

9. A camera comprising:
a lens apparatus according to claim 3; and
an image pickup element configured to receive light from the lens apparatus.

10. A camera comprising:
a lens apparatus according to claim 4; and
an image pickup element configured to receive light from the lens apparatus.

11. A camera comprising:
a lens apparatus according to claim 5; and
an image pickup element configured to receive light from the lens apparatus.

12. A camera comprising:

a lens apparatus according to claim 6; and an image pickup element configured to receive light from the lens apparatus.

13. A camera system comprising:

a lens apparatus according to claim 1; and a camera main body on which the lens apparatus is removably attached, wherein the camera main body includes an image pickup element configured to receive light from the lens apparatus.

14. A camera system comprising:

a lens apparatus according to claim 2; and a camera main body on which the lens apparatus is removably attached, wherein the camera main body includes an image pickup element configured to receive light from the lens apparatus.

15. A camera system comprising:

a lens apparatus according to claim 3; and a camera main body on which the lens apparatus is removably attached, wherein the camera main body includes an image pickup element configured to receive light from the lens apparatus.

16. A camera system comprising:

a lens apparatus according to claim 4; and a camera main body on which the lens apparatus is removably attached, wherein the camera main body includes an image pickup element configured to receive light from the lens apparatus.

17. A camera system comprising:

a lens apparatus according to claim 5; and a camera main body on which the lens apparatus is removably attached, wherein the camera main body includes an image pickup element configured to receive light from the lens apparatus.

18. A camera system comprising:

a lens apparatus according to claim 6; and a camera main body on which the lens apparatus is removably attached, wherein the camera main body includes an image pickup element configured to receive light from the lens apparatus.

\* \* \* \* \*